March 25, 1947. T. BARISH 2,417,854

AIRPLANE WHEEL AND BRAKE

Filed May 29, 1945

Inventor

THOMAS BARISH

By Scrivener & Parker

Attorneys

Patented Mar. 25, 1947

2,417,854

UNITED STATES PATENT OFFICE 2,417,854

AIRPLANE WHEEL AND BRAKE

Thomas Barish, University Park, Md., assignor to Engineering and Research Corporation, Riverdale, Md., a corporation of Maryland Application May 29, 1945, Serial No. 596,457

8 Claims. (Cl. 188—18)

This invention relates to wheel and brake assemblies for aircraft and, more particularly, to such assemblies in which the brake device is of the disc type.

Known wheel and brake assemblies of the general type to which the invention relates comprise, in addition to the wheel, a disc splined to the wheel and rotatable therewith and movable axially thereof, other discs on either side of the wheel-mounted discs, one of which is fixed to the axle and one of which is splined to the axle whereby it is held against rotation but may be moved axially into engagement with the wheel-mounted disc, and means which may be hydraulic or mechanical in operation for moving the axially-movable disc and the wheel-mounted disc into engagement with the fixed disc, to thereby clamp the wheel-mounted disc and stop rotation thereof. It is also known and usual practise in wheel and brake assemblies of this type to provide an airplane wheel formed of two substantially identical, generally cylindrical halves which are bolted together to form the complete wheel.

By the present invention I have provide a wheel and brake assembly of the described type having new and improved features of construction and operation whereby such assemblies may be more easily and cheaply made and may be assembled and taken apart more quickly and simply.

While the provision of such an improved and simplified brake constitutes the principal object of my invention, other objects and features of novelty will be made apparent by the following description and the annexed drawings which, it will be understood, are only illustrative of the invention and impose no limitation thereon not imposed by the appended claims.

Figure 1:
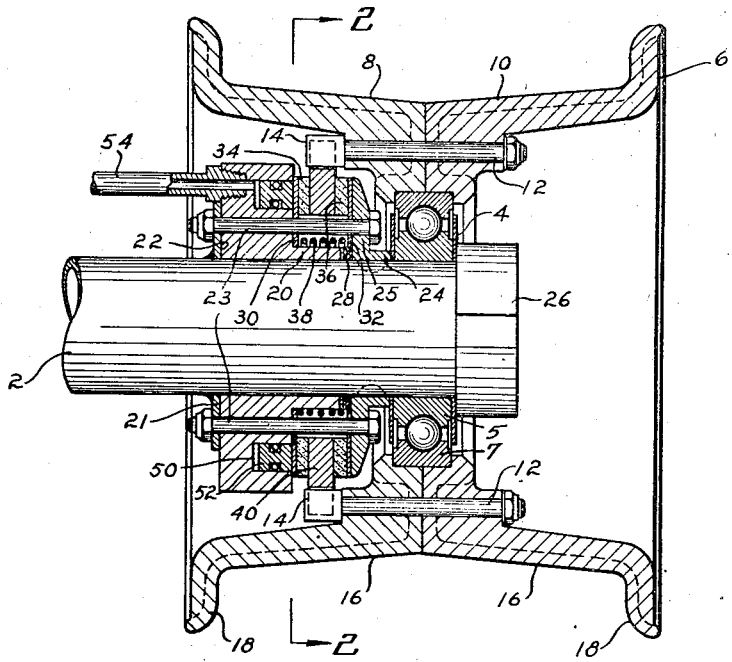
Figure 2:
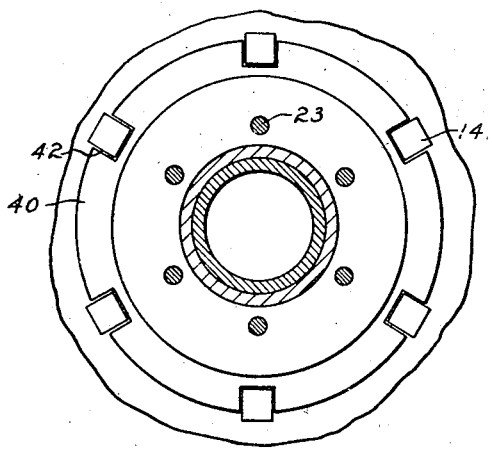

Referring to the drawings, in which similar reference numerals refer to like parts, Fig. 1 is a cross-sectional view through a wheel and brake assembly according to my invention, and Fig. 2 is a partial sectional view taken on line 2—2 of Fig. 1.

An improved wheel and brake assembly according to my invention is disclosed in the drawings and comprises a fixed axle 2 on which, adjacent the outer end, is keyed the inner race 5 of a bearing 4 having a single row of balls. The outer race 7 of the bearing is attached centrally of the web of a wheel 6 which is formed in two substantially identical cylindrical parts 8, 10, the abutting faces of which are co-planar with the centers of the balls of bearing 4. The two halves of the wheel are connected by a circular series of bolts 12 which extend through the web of the wheel and at their one ends have heads 14 which are preferably square in cross-section but which may have any other suitable cross-sectional shape, for a purpose to be described hereinafter.

Each of the two parts of the wheel is provided with a generally cylindrical tire-receiving rim 16 having an axially-displaced tire-retaining flange 18.

Means are provided by the invention for stopping the rotation of the wheel. Such means are disposed within or beneath the flange 16 on one side of the bearing 4 and between the bearing and the tire retaining flange 18 on the same side of the bearing. These brake means comprise a sleeve part 20 which surrounds the axle 2 and the axially-outermost part of which is formed as a flange 22 extending radially outwardly from the sleeve 20 and preferably formed integrally therewith. The sleeve 20 is rigidly but releasably connected to the axle by attachment to an end plate 21 which surrounds the axle and is welded or otherwise rigidly attached thereto. A second sleeve 24 surrounds the axle between sleeve 20 and the bearing 4, is keyed to the axle, and has a preferably integral flange 25 extending radially outwardly therefrom and which is axially spaced from the flange 22. The flanges are connected by a circular series of bolts 23 which extend axially thereof and across the space therebetween. One end of sleeve 24 abuts one face of the inner race of bearing 4 and the axle 2 is screw-threaded at its outer end to receive a nut 26 which abuts the outer face of the inner race, whereby the bearing 4 is positioned along the axle.

In accordance with the invention the sleeves 20 and 24 are separate, are separately mounted on the axle and are spaced apart by shims 28. By adjustment of the number of shims the position of bearing 4 along the axle or the spacing between the flanges 22, 24 may be adjusted.

Mounted within the space between flanges 22, 24 are two annular friction discs 30, 32. One face of disc 30 abuts flange 22 and the disc is provided with an annular series of holes through which the bolts 23 extend, whereby disc 30 is axially movable, and is also provided with an inwardly facing friction facing 34. One face of disc 32 abuts flange 25, and the disc is provided with an annular series of holes through which the bolts 23 pass, and is also provided with an inwardly-facing friction facing 36. A helical compression spring 38 surrounds axle 2 between the discs 30, 32 and constantly wedges the discs apart.

Mounted between the discs 30, 32 and between the friction facings thereon is an annular brake disc 40, the outer peripheral edge of which is provided with an annular series of openings 42 within which the heads 14 of bolts 12 are received, whereby the disc 40 is supported in the described position and may be moved axially. The apertures 42 in disc 40 are preferably of the same shape as the cross-sectional shape of the heads 14 of bolts 12.

Means are provided by the invention for operating the braking means, and such means comprise an annular channel 50 formed in the inner face of flange 22 and constituting a cylinder within which an annular piston 52 is mounted for axial movement. The cylinder, rearwardly of piston 52, is connected through conduit 54 to a source of fluid under pressure whereby the piston 54 may be operatively moved.

In the operation of the described braking means, fluid under pressure is admitted to cylinder 50 through pipe 54, causing piston 52 to move to the right, as viewed in Fig. 1, thus causing friction disc 30 to move axially, against the force of spring 38, until its friction facing 34 abuts brake disc 40 and causes it to move axially on the bolt heads 14 until it engages the friction facing 36 on friction disc 32. Further movement of the piston will now cause the brake disc 40 to be clamped between the friction facings on discs 30, 32 which, because of their mounting on fixed bolts 23, are held from rotation. The rotation of brake disc 40 and the wheel will therefore be stopped.

It will be seen that I have provided a simplified and improved wheel and brake structure and arrangement having few parts and being capable of simple construction, assembly, adjustment and removal. While I have described and illustrated but one embodiment of the invention it will be apparent to those skilled in the art that other embodiments, as well as modifications of that disclosed, may be made without departing in any way from the spirit or scope of the invention, for the limits of which reference must be had to the appended claims.

What is claimed is:

1. An airplane wheel and brake assembly comprising a fixed axle, a wheel having a rim and a web surrounding said axle, a single bearing between the web and the axle and comprising an outer race attached to the web, an inner race surrounding the axle, and a single row of balls between the races, braking means surrounding the axle at one side of said bearing and having parts attached to the axle and abutting one side face of the inner race to provide an abutment therefor, and means screw-threaded to the axle at the other side of the bearing and abutting the adjacent side of the inner race for forcing the inner race against said abutment.

2. An airplane wheel and brake assembly according to claim 1, in which the web and bearing are disposed centrally of the rim of the wheel.

3. An airplane wheel and brake assembly, comprising a fixed axle, a wheel having a rim and a web surrounding said axle, a single bearing between the web and the axle and comprising an outer race attached to the web, an inner race surrounding the axle, and a single row of balls between the races, axially spaced means surrounding and connected to the axle at one side of said bearing one of which has an end part abutting one side face of the inner race to provide an abutment therefor, means screw-threaded to the axle at the other side of the bearing and abutting the adjacent side face of the inner race for forcing the inner race against said abutment, means for adjusting the axial spacing between said spaced means and for adjusting the axial position of that one of such spaced means which abuts the inner race, co-operable braking discs disposed between said spaced means and surrounding the axle and being respectively connected to the wheel and the axle, and means for forcing said braking discs into braking relation with each other.

4. An airplane wheel and brake assembly, comprising a fixed axle, a wheel having a rim and a web surrounding said axle, a single bearing between the web and the axle and comprising an outer race attached to the web, an inner race surrounding the axle, and a single row of balls between the races, two sleeves surrounding and connected to said shaft and relatively movable axially thereof and each having a flange extending radially therefrom, means for rigidly but adjustably connecting said sleeves together, the end of one of said sleeves abutting one side face of the inner race to provide an abutment therefor, means screw-threaded to the axle at the other side of the bearing and abutting the adjacent side face of the inner race for forcing the inner race against said abutting sleeve, co-operable braking discs disposed between said flanges and surrounding the axle and connected respectively to the wheel and the axle, and means for forcing said braking discs into braking relation with each other.

5. A wheel and brake assembly comprising an axle, a wheel journaled on said axle and comprising two generally cylindrical parts each having a rim part and a web part and an annular series of bolts extending through the abutting web parts to connect the two parts of the wheel, each of said bolts having on one side of the web a head extending axially beyond the web, braking means on said side of the web comprising an annular braking disc surrounding the axle and having a plurality of openings in the outer periphery thereof within which said ends of the bolts are received whereby the braking disc is mounted for rotation with the wheel and for movement axially thereof, and means for stopping rotation of said braking disc.

6. A wheel and brake assembly according to claim 5, in which the shape of the openings in the braking disc is the same as the cross-sectional shape of the bolt heads received therein.

7. A wheel and brake assembly according to claim 5, in which openings in the braking disc and the cross-sectional shape of the bolt heads received therein are both square.

8. A disc brake for an airplane having an axle and a wheel journaled on the axle, comprising a sleeve surrounding and fixed to the axle and having an annular flange extending radially outwardly therefrom, a second sleeve surrounding and fixed to the axle and having a flange extending radially outwardly therefrom and spaced axially of the first flange, an annular series of bolts extending axially through said flanges and across the space therebetween for rigidly connecting said sleeves and flanges, two annular friction discs mounted between said flanges and surrounding the axle and each having an annular series of holes therein through which said bolts extend and whereby each of said discs is held from rotation, a third annular disc surrounding the axle and disposed between said spaced non-rotatable discs and connected to the wheel for rotation therewith, means for forcing said discs into braking engagement with each other, and a helical coil spring surrounding the axle between the flanges and disposed between said spaced non-rotatable discs for constantly urging the same apart.

THOMAS BARISH.

REFERENCES CITED

The following references are of record in the file of this patent:

UNITED STATES PATENTS

| Number | Name | Date |
|---|---|---|
| 2,017,715 | Goodyear et al. | Oct. 15, 1935 |
| 2,094,065 | Frank | Sept. 28, 1937 |
| 2,024,093 | Crew | Dec. 10, 1935 |
| 1,909,744 | Berg | May 16, 1933 |
| 2,174,635 | Linderman | Oct. 3, 1939 |
| 1,560,014 | Billings | Nov. 3, 1925 |
| 2,304,944 | Martinec | Dec. 15, 1942 |
| 2,137,987 | Smith | Nov. 22, 1938 |
| 2,063,444 | Lambert | Dec. 8, 1936 |
| 2,248,383 | Pogue et al. | July 8, 1941 |
| 2,282,359 | Hollerith | May 12, 1942 |
| 2,076,531 | Ferris | Apr. 13, 1937 |
| 2,149,349 | Kilian | Mar. 7, 1939 |

FOREIGN PATENTS

| Number | Country | Date |
|---|---|---|
| 294,814 | British | Aug. 2, 1928 |